United States Patent
Bi et al.

(10) Patent No.: US 9,061,486 B2
(45) Date of Patent: Jun. 23, 2015

(54) ID DOCUMENTS HAVING A MULTI-LAYERED LAMINATE STRUCTURE

(75) Inventors: Daoshen Bi, Boxborough, MA (US); Robert L. Jones, Andover, MA (US)

(73) Assignee: L-1 SECURE CREDENTIALING, LLC, Billerica, MA (US)

( * ) Notice: Subject to any disclaimer, the term of this patent is extended or adjusted under 35 U.S.C. 154(b) by 337 days.

(21) Appl. No.: 13/309,817

(22) Filed: Dec. 2, 2011

(65) Prior Publication Data
US 2012/0138689 A1 Jun. 7, 2012

Related U.S. Application Data

(60) Provisional application No. 61/420,118, filed on Dec. 6, 2010.

(51) Int. Cl.
| | | |
|---|---|---|
| G06K 19/02 | (2006.01) |
| B32B 37/04 | (2006.01) |
| B42D 25/00 | (2014.01) |
| B32B 38/00 | (2006.01) |
| B42D 25/455 | (2014.01) |

(52) U.S. Cl.
CPC ......... *B32B 37/04* (2013.01); *Y10T 428/31507* (2015.04); *B32B 38/145* (2013.01); *B32B 2305/342* (2013.01); *B32B 2309/105* (2013.01); *B32B 2310/0843* (2013.01); *B32B 2367/00* (2013.01); *B32B 2425/00* (2013.01); *B32B 2519/02* (2013.01); *B42D 25/00* (2014.10); *B42D 25/455* (2014.10)

(58) Field of Classification Search
USPC .................................. 235/488; 428/217, 412
See application file for complete search history.

(56) References Cited

U.S. PATENT DOCUMENTS

| | | | |
|---|---|---|---|
| 3,413,171 A | | 11/1968 | Hannon |
| 4,713,267 A | * | 12/1987 | Truskolaski ...................... 428/4 |
| 7,383,999 B2 | | 6/2008 | Bi |
| 7,823,792 B2 | | 11/2010 | Bi |
| 2002/0146549 A1 | * | 10/2002 | Kranenburg-Van et al. .. 428/217 |
| 2002/0167692 A1 | * | 11/2002 | Cunningham .................... 359/2 |

(Continued)

FOREIGN PATENT DOCUMENTS

| | | |
|---|---|---|
| EP | 2014463 A1 | 1/2009 |
| GB | 2143775 A | 2/1985 |
| JP | 9327988 A | 12/1997 |

OTHER PUBLICATIONS

Mineko Mohri, International Preliminary Report on Patentability, International Application No. PCT/US2011/063257, mailed Jun. 20, 2013, 7 pages.

(Continued)

*Primary Examiner* — Allyson Trail
(74) *Attorney, Agent, or Firm* — Fish & Richardson P.C.

(57) ABSTRACT

An ID document includes a document core and a multi-layer laminate. The multi-layer laminate includes at least three layers: a top layer, a middle layer, and a bottom layer. The top layer, in combination with other layers, provides durability to the ID document. The top layer can be made of a material with strong intrusion or scratch resistance and a high thermal softening/deformation point and can also have high resistance to solvents. The middle layer may be made of a material with a low melting point, and may also have high resistance to solvents. The bottom layer helps to facilitate strong binding to the document core or inlay and may be made of a material with a relatively high melting point.

36 Claims, 1 Drawing Sheet

(56) References Cited

U.S. PATENT DOCUMENTS

| | | |
|---|---|---|
| 2002/0168513 A1 | 11/2002 | Hattori |
| 2005/0259326 A1* | 11/2005 | Weber et al. ............. 359/589 |
| 2006/0157570 A1* | 7/2006 | Day ............................ 235/487 |
| 2006/0251869 A1 | 11/2006 | Herslow |
| 2007/0257797 A1 | 11/2007 | Rancien |
| 2010/0235037 A1* | 9/2010 | Vian et al. ................. 701/29 |
| 2011/0266349 A1 | 11/2011 | Bi |
| 2011/0266352 A1* | 11/2011 | Fein ........................... 235/488 |

OTHER PUBLICATIONS

Supplementary European Search Report dated Mar. 9, 2015 from corresponding European Application No. EP 11 84 6984, 3 pages.

\* cited by examiner

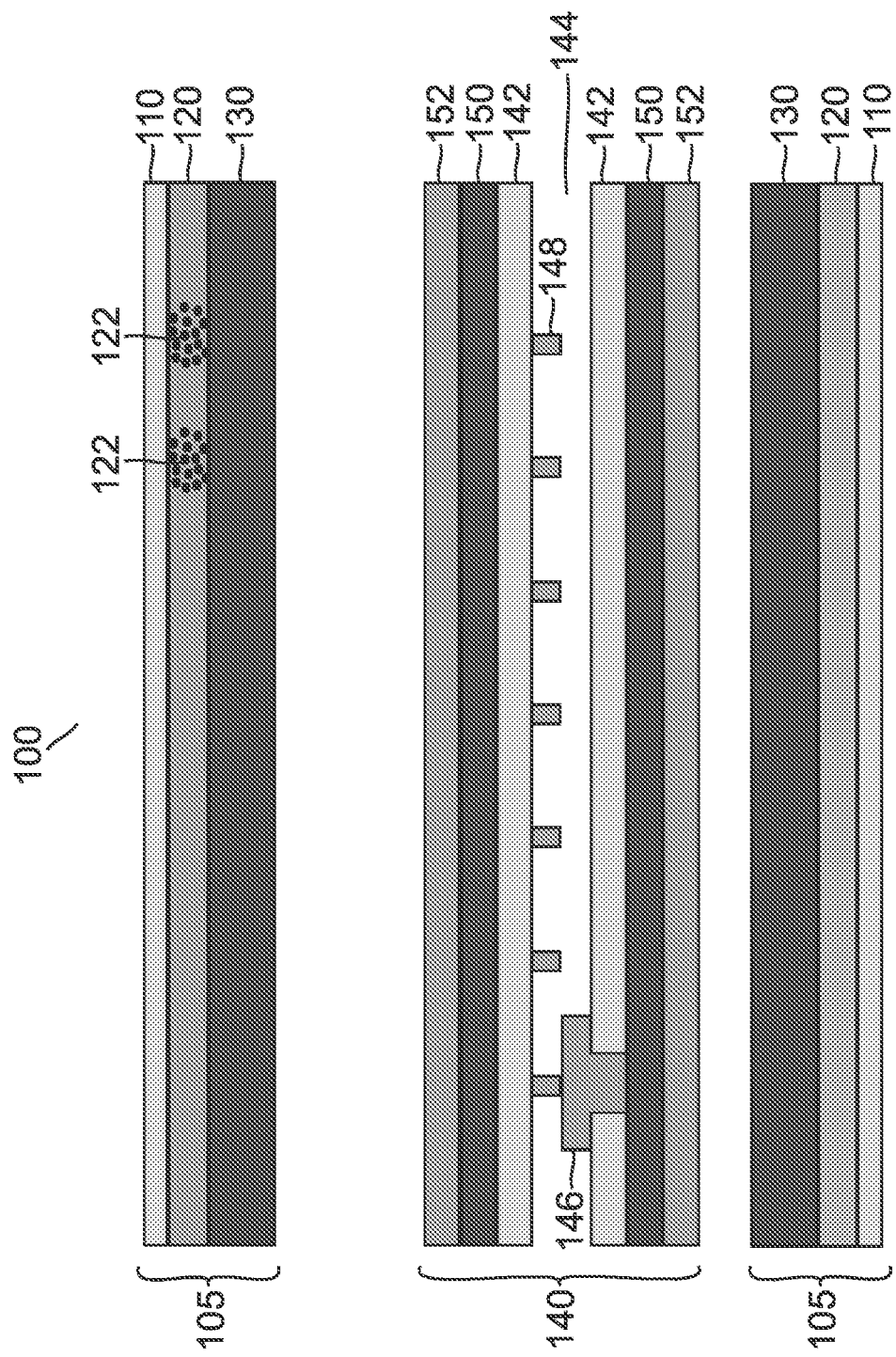

ID DOCUMENTS HAVING A MULTI-LAYERED LAMINATE STRUCTURE

CROSS-REFERENCE TO RELATED ACTIONS

This application claims the benefit of U.S. Provisional Application No. 61/420,118, filed Dec. 6, 2010, which is incorporated by reference herein in its entirety.

FIELD OF THE INVENTION

The subject invention generally relates to ID documents, and more particularly, to ID documents and smart cards with a multi-layer laminate construction.

BACKGROUND OF THE INVENTION

Identification documents (hereafter, "ID documents") play a critical role in today's society. One example of an ID document is an identification card ("ID card"). ID documents are used on a daily basis—to prove identity, to verify age, to access a secure area, to evidence driving privileges, to cash a check, and so on. In addition, because we live in an ever-evolving cashless society, ID documents are used to make payments, access an automated teller machine (ATM), debit an account, or make a payment, etc.

For the purposes of this disclosure, ID documents are broadly defined herein, and include, e.g., credit cards, bank cards, phone cards, passports, driver's licenses, network access cards, employee badges, debit cards, security cards, visas, immigration documentation, national ID cards, citizenship cards, social security cards, security badges, certificates, identification cards or documents, voter registration cards, police ID cards, border crossing cards, legal instruments, security clearance badges and cards, gun permits, gift certificates or cards, membership cards or badges, etc., etc. Also, the terms "document", "card", "badge", and "documentation" are used interchangeably throughout this patent application.

Many types of identification cards and documents, such as driving licenses, national or government identification cards, bank cards, credit cards, controlled access cards and smart cards, carry certain items of information which relate to the identity of the bearer. Examples of such information include name, address, birth date, signature and photographic image; the cards or documents may in addition carry other variable data (i.e., data specific to a particular card or document, for example an employee number) and fixed data (i.e., data common to a large number of cards, for example the name of an employer). U.S. Pat. No. 7,383,999, entitled "ID Document Structure with Pattern Coating Providing Variable Security Features", discloses variable security features on ID documents and is incorporated herein by reference in its entirety. All of the cards described above will be generically referred to as "ID documents".

The term "smart card" as used herein is defined broadly to generally include a device that carries information. The definition of a smart card used in this application is broad enough to include so-called radio frequency identification cards or RFID cards. A smart card typically includes a microprocessor (or electronic processing circuitry) and/or memory circuitry embedded therein. The electronic circuitry is often packaged as a module. A memory smart card stores information in electronic memory circuits, while a processor smart card can manipulate information stored in associated memory. A smart card module can contain one or both of a processing circuitry and a memory circuitry. Some smart cards are passive in that they lack an internal power source. Power can be supplied through an interface which energizes the smart card's internal circuits. Some other smart cards can include an internal power source. U.S. Pat. No. 7,823,792, entitled "Contact Smart Cards Having a Document Core, Contactless Smart Cards Including Multi-layered Structure, PET-based Identification Document, and Methods of Making Same", and its continuation application (U.S. patent application Ser. No. 12/917,186, filed on Nov. 1, 2010) disclose structures of contact smart cards and contactless smart cards. Both the foregoing patent and patent application, respectively, are incorporated herein by reference in their entirety.

Smart cards are capable of performing a variety of functions, including but not limited to carrying data, manipulation or processing information and data, controlling access (e.g., by carrying pass codes, biometric data, passwords, etc.), providing identifying information, holding biometric data, etc.

Commercial systems for issuing ID documents are of two main types, namely so-called central issue ("CI") and so-called on-the-spot or over-the-counter ("OTC") issue. Central Issue type ID documents are not immediately provided to the bearer, but are later issued to the bearer after having been manufactured at a central location. For example, in one type of CI environment, a bearer reports to a document station where data is collected, the data is then forwarded to a central location where the card is produced, and the card is then forwarded to the bearer, often by mail. Another illustrative example of a CI assembling process occurs in a setting in which a driver passes a driving test, but then receives her license in the mail from a CI facility a short time later. Still another illustrative example of a CI assembling process occurs in a setting in which a driver renews her license by mail or over the Internet, then receives a drivers license through the mail.

A CI assembling process can be more of a bulk process facility, in which many cards are produced in a centralized facility, one after another. The CI facility can, for example, process thousands of cards in a continuous manner. Because the processing occurs in bulk, CI can have an increase in efficiency as compared to some OTC processes, especially those OTC processes that run intermittently. Thus, CI processes can sometimes have a lower cost per ID document if a large volume of ID documents are manufactured.

In contrast to CI ID documents, OTC ID documents are issued immediately to a bearer who is present at a document-issuing station. An OTC assembling process provides an ID document "on-the-spot". An illustrative example of an OTC assembling process is a Department of Motor Vehicles setting where a driver's license is issued to a person, on the spot, after a successful exam. In some instances, the very nature of the OTC assembling process results in small, sometimes compact, printing and card assemblers for printing the ID documents.

ID documents are often made to be in compliance with certain international and/or national standards. Examples of these standards include ISO 7810 on physical characteristics of ID cards, ISO 10373 on test methods of ID cards, ANSI/NCITS 322 on card durability test methods, ISO 7816 on smart cards, ISO 14443 on contactless smart cards, etc.

Different units may be used throughout this patent application to define caliper (i.e., depth) of various layers of an ID document. For example, 1 mil is ¹/1000 inch, about 0.0254 millimeters.

Some desired features of ID documents include, e.g., durability, resistance to physical and/or heat intrusion, solvent attach resistance, tamper evidence and low cost to produce and assemble.

SUMMARY OF THE INVENTION

In general, in an aspect, the invention provides an ID document with a document core and a multi-layer laminate. The multi-layer laminate includes at least three layers: a top layer, a middle layer, and a bottom layer. The document core can incorporate a semiconductor module and antenna structure to facilitate the making of a smart card.

Implementations of the invention may provide one or more of the following features. The top layer, in combination with other layers, provides durability to the ID document. The top layer is made of a material with high mechanical strength, strong intrusion or scratch resistance, high resistance to chemicals, and having a high resistance to deformation, softening, melting or degradation upon the application of heat ("thermal softening/deformation point"). The thermal softening/deformation point is significantly in excess of the melting point of either the middle layer or the bottom layer. The top layer material can also have high resistance to solvents. One example of such material is a Biax Polyethylene Terephthalate ("Biax PET"). The middle layer is made of a material with a low melting point, such as a polymer hot melt ("h.m."). The middle layer material can also have high resistance to solvents. The bottom layer helps to facilitate strong binding to the document core or inlay. The bottom layer is made of a material with a relatively high melting point.

Implementations of the invention may also provide one or more of the following features. The multi-layer laminate may contain engraving. The engraving can be achieved through use of laser engraving. The caliper of the multi-layer laminate can range from about 4 mils to about 10+ mils, preferably about 6 mils. In a 6-mil lamina, the caliper of the top layer may be 1 mil or 2 mils. The caliper of the middle layer may be 2 mils. The caliper of the bottom layer may be 3 mils.

Implementations of the invention may further provide one or more of the following features. The melting point of the bottom layer may be selected to be higher than that of the middle layer, but lower than the thermal softening/deformation point of the top layer. The difference in melting and thermal softening/deformation points among different layers of the laminate helps to defend the ID document from heating attacks and/or provide tamper evidence upon the occurrence of heating attacks. Heating attacks commonly occur when a person seeking to disassemble an ID document uses a heat source, such as a heat gun, to cause delamination of the different layers of the ID document.

In the event of a heating attack by a person attempting to disassemble or modify an ID document of the present invention, due to the very high thermal softening/deformation point of the top layer, the middle layer will soften first and this will cause a release of the top layer from the remainder of the ID document. Upon further heating, the middle layer laminate becomes more and more fluid while the document core remains intact. In any case, the attacked ID document shows evidence of tampering. Reassembly by reattaching the top layer is extremely difficult to impossible due to the fact that a highly crosslinked primer is used to bond the top layer to the middle layer and the primer is no longer able to be activated after it is first formed into the lamina. The top layer, with its very high thermal softening/deformation point and heat attach resistance can be seen to "shield" the remainder of the ID document and hide the melting of the middle layer that is occurring during a heating attack.

One embodiment of the invention is an ID document including a document core layer having two opposed surfaces and a multi-layer laminate on at least one surface of the document core layer. The multi-layer laminate has a top layer, a middle layer, and a bottom layer. The melting point of the bottom layer is higher than the melting point of the middle layer but is lower than the thermal softening/deformation point of the top layer.

Another embodiment of the invention is an ID document comprising a document core having two opposed surfaces and a multi-layer laminate on at least one surface of the document core. The multi-layer laminate has a top layer. The top layer is composed of a first material having at least one of: strong intrusion resistance, high scratch resistance, high mechanical strength, high chemical resistance, high thermal softening/deformation point and high resistance to solvents. The multi-layer laminate has a middle layer. The middle layer is composed of a second material having a low melting point. The multi-layer laminate has a bottom layer. The bottom layer is composed of a third material having strong binding to the document core and a melting point higher than the middle layer.

Yet another embodiment of the invention is a smart card document comprising an inlay having two opposed surfaces and a multi-layer laminate on at least one surface of the inlay. The inlay further comprises at least one of an electronic processing circuitry and an electronic memory circuitry embedded therein. The multi-layer laminate has a top layer, a middle layer, and a bottom layer. The melting point of the bottom layer is higher than the melting point of the middle layer but is lower than the thermal softening/deformation point of the top layer.

Yet another embodiment of the invention is a method of manufacturing a smart card document comprising providing an inlay having two opposed surfaces, providing a multi-layer laminate, and applying the multi-layer laminate on at least one surface of the inlay. The inlay comprises at least one of an electronic processing circuitry and an electronic memory circuitry embedded therein. The multi-layer laminate comprises a top layer, a middle layer, and a bottom layer. The melting point of the bottom layer is higher than the melting point of the middle layer but is lower than the thermal softening/deformation point of the top layer.

Embodiments of the invention may contain one or more of the following features.

The top layer may be about 1 mil to about 2 mils in thickness.

The middle layer may be about 2 mils in thickness.

The bottom layer may be about 3 mils in thickness.

The multi-layer laminate may be disposed on both opposed surfaces of the document core layer.

The ID document may further comprise an inlay having two opposed surfaces.

The inlay may further comprise at least one of an electronic processing circuitry and an electronic memory circuitry embedded therein.

The top layer may comprise a material with at least one of strong intrusion resistance, high mechanical strength, high chemical resistance, high solvent resistance and high scratch resistance.

The top layer material may comprise a Biax Polyethylene Terephthalate (Biax PET) material.

The middle layer may comprise a material with a low melting point.

The middle layer may comprise a polymer hot melt material.

The bottom layer may comprise a material with a relatively high softening point and stronger mechanical strength than the middle layer.

The melting point of the middle layer may be in the range of about 200° C. to about 220° C.

The melting point of the bottom layer may be in the range of about 260° C. to about 280° C.

The thermal softening/deformation point of the top layer may be significantly higher than the melting point ranges of the middle layer and the bottom layer.

The top layer may comprise a material with a high resistance to solvents.

The inlay may further comprise an outer layer on each of the opposed surfaces, the outer layer comprising a Teslin® material.

Laser engraving may be within at least one of the middle layer and the bottom layer. Laser Engraving in both the text and photo formats is possible by sensitizing the middle and bottom layers. Use of a 1 mil top PET film layer is best to attain good definition tactile laser engraving quality and functionality.

The multi-layer laminate may be in the range of about 4 mils to about 10 mils thickness.

The multi-layer laminate may be about 6 mils in thickness.

The multi-layer laminate may pass at least one of: an IAB Flex Test and a Severe Service Test.

The IAB Flex Test may have at least 50,000 flexes.

The Severe Service Test may be conducted at a temperature of about 70° C. The Severe Service Test when conducted at a temperature of 70° C. is the best to ensure excellent test conditions on durability. Lower temperatures do not give discerning results.

The step of applying the multi-layer laminate to the at least one surface of the inlay may comprise applying at least one of pressure and heat to bond the multi-layer laminate to the at least one surface of the inlay.

The step of applying pressure may comprise pressing the multi-layer laminate to the inlay with a pressure in the range of about 40 psi to about 60 psi.

The step of applying pressure may have a duration of time of about 0.5 seconds to about 2.0 seconds per inch.

The step of applying heat may comprise heating at least one of the multi-layer laminate and the inlay to heat in the range of about 325 F.° to about 370 F.°.

Both heat and pressure may be applied to bond the multi-layer laminate to the inlay.

The application of heat for the purpose of intrusion may cause the middle layer to soften and melt while the top layer remains intact.

Attempts to physically intrude into the smart card may cause the top layer to be separated from the middle layer.

The melting point of the middle layer may be in the range of about 200° C. to about 220° C.

The melting point of the bottom layer may be in the range of about 260° C. to about 280° C.

The thermal softening/deformation point of the top layer may be significantly higher than the melting point ranges of both the middle layer and the bottom layer.

The thermal softening/deformation point of the top layer may be greater than the melting point ranges of both the middle layer and the bottom layer.

The thermal softening/deformation point of the top layer may be greater than about 300° C.

The laser engraving may be at least one of fixed information or variable information.

At least one of the middle layer and the bottom layer may contain a sensitizer additive to facilitate absorption of laser engraving.

At least one of the middle layer and the bottom layer may be a material which absorbs laser energy.

These and other capabilities of the invention, along with the invention itself, will be more fully understood after a review of the following figures, detailed description, and claims.

BRIEF DESCRIPTION OF THE FIGURES

FIG. 1 illustrates the structure of an ID document with a multi-layer laminate according to one embodiment of the invention.

DETAILED DESCRIPTION

Embodiments of the invention provide an ID document with multi-layer laminate. The multi-layer laminate provide the ID document certain features, such as durability, resistance to physical and/or heat intrusion, and tamper evidence.

FIG. 1 illustrates the structure of an ID document 100 with a multi-layer laminate 105 according to one embodiment of the invention. The multi-layer laminate 105 can be applied to at least one surface of a document core or inlay 140 to be protected. The document core or inlay 140 can contain at least one module 146 sandwiched between two outer layers 142. The module 146 can be connected to at least one antenna 148, which can also be sandwiched between the two outer layers 142. The antenna 148 can be a wired structure, such as in an HID inlay, or be a printed structure, such as in a KSW inlay. An adhesive 144 (e.g., a cross-linked urethane seal) can fill in between the two outer layers 142. Attempts to gain access to the module 146 can destroy the module 146 and/or the antenna 148 because of the intense heat and physical force involved.

In one implementation, the module 146 can be one of many commercially available modules, such as a moB6 Module; the antenna 148 can be an 80μ or 60 micron Cu antenna. The outer layers 142 can be made of many commercially available polymers, such as Teslin® from PPG Industries Ohio, Inc. In another implementation, each of the outer layers 142 may be selected to be about 7 mils each and the adhesive 144 may be selected to be about 4-5 mils, bringing the total caliper of the document core or inlay 140 to about 19 mils. The document core or inlay 140 can optionally be preprinted, for example, with banknote level design 150. Fixed or variable information 152 can be printed on the document core or inlay 140 using various printing techniques, such as 5252 Xerographic. The document core or inlay 140 can be selected so as to either provide for its own durability or if it lacks such intrinsic durability, rely on outer laminates 105 to provide such durability.

As illustrated in FIG. 1, the multi-layer laminate 105 preferably comprises at least three layers, although fewer or greater than three layers can also be used. The top layer 110 helps to provide durability to the laminate 105, to the document core or inlay 140, and/or to the whole ID document 100. The top layer 110, in combination with the middle layer 120 and the bottom layer 130, helps to ensure that the whole ID document passes the required flex, stress/cracking, impact, and severe service ("SS") testing. Preferably, the top layer 110 is made of a material having high mechanical strength, strong intrusion or scratch resistance, high chemical resistance, and has a very high resistance to heat attacks since it has a thermal softening/deformation point far in excess of the melting points of the middle and bottom layers. Preferably, the top layer material also has high resistance to solvents. The insolubility characteristic of the top layer 110 helps to protect the ID document 100 from solvent attacks. One example of such a material that provides both strong intrusion resistance and resistance to solvent attacks is a Biax Polyethylene Terephthalate ("Biax PET"). Biax PET is generally commercially available, from example, from DuPont.

The middle layer 120 helps to provide adhesion between the top layer 110 and the bottom layer 130. The middle layer 120 is preferably made of a material with a low melting point, such as a polymer hot melt ("h.m."). One example of such material is a Polyethylenic h.m.; another example of such material is a Polyolefinic h.m.; yet another example is a Polyethylene ethylacrylic acid (EEA) polymer. Preferably, the middle layer material also has high resistance to solvents. The insolubility characteristic of the middle layer 120 also helps to protect the ID document 100 from solvent attacks.

The bottom layer 130 helps to facilitate strong binding to the document core or inlay 140. The bottom layer 130 is, preferably, made of a material with a relatively high melting point—higher than that of the middle layer 120. One example of such material is a copolyester. Such material is generally commercially available, such as 6763, from Eastman Chemical.

To enhance security features, the multi-layer laminate 105 can contain engraving 122. One way to achieve engraving is through use of a laser (e.g., a YAG laser). To facilitate laser engraving, the material in the layer targeted by laser is, preferably, easily sensitized to laser (e.g., a YAG laser) light. The engraving 122 can contain fixed information (e.g., a logo or a pattern) or variable information (e.g., information uniquely associated with the bearer of the ID document) or both. If the material in the layer targeted by the laser is not capable of absorbing laser energy in its native state, either or both layers 120 and 130 can be sensitized with an additive so that data/imagery can be deposited on one or both layers. For the case of tactile engraving, it is preferred to have the sensitizing additive in the second layer at a minimum. U.S. Pat. No. 7,207,494, entitled "Laser Etched Security Features for Identification Documents and Methods of Making Same", and its continuation (U.S. Pat. No. 7,661,600) disclose laser etched security features for identification documents. Both patents are incorporated herein by reference in their entirety.

In one implementation of the multi-layer laminate 105, the caliper of the multi-layer laminate 105 may range from about 4 mils to about 10+ mils, preferably about 6 mils. The caliper of the top layer 110 may be, preferably, about 1 mil to about 2 mils. The caliper of the middle layer 120 may be, preferably, about 2 mils. The caliper of the bottom layer 130 may be, preferably, about 3 mils. Experiments have demonstrated that a 1-mil top layer 110 can provide sufficient durability and intrusion protection, allow tactile engraving (e.g., via laser), and cause few if any problems in terms of curl control on finished ID documents and coating/printing.

One preferred implementation of the ID document 100 may be made so as to have two 6-mil multi-layer laminates and one 19-mil document core or inlay, bringing its total caliper to about 31 mils—thus complying with the ISO 7810 requirement on ID document depth (about 0.76 millimeter).

In the assembly of the ID document, the ID document may be assembled by applying pressure and/or heat to better seal the layers together. For example, the pressure applied may be in the range of about 40 psi to about 60 psi and be applied to the layers for a duration of about 0.5 to about 2.0 second per inch at a temperature varying from about 325° F. to about 370° F.

In another implementation of the multi-layer laminate 105, the melting point of the bottom layer 130 may be, preferably, higher than that of the middle layer 120, but lower than the thermal softening/deformation point of the top layer 110. The difference in melting points and/or thermal softening/deformation points among different layers of the laminate 105 helps to protect the ID documents from heating attacks and/or provide tamper evidence of such heating attacks. An intruder's heating attack on an ID document typically follows in the following steps: The intruder first heats the ID document to a certain degree (e.g., above 220 F) in order to soften the ID document. Once the ID document is softened by heat, the intruder begins to probe the ID document structure at its corners. If the ID document structure yields at corners, the intruder pulls up one corner of an outer layer of the ID document (which remains intact despite the heat attack) and keeps applying heat until the still-intact outer layer is removed from the ID document. If there are multiple layers, the intruder repeats this heat-and-peel process until the ID document core containing the sought-after information and/or modules are exposed and accessible.

Such heating attacks are ineffective on ID documents protected by the multi-layer laminate 105 of the present invention illustrated in FIG. 1. When the intruder heats the ID document 100, the middle layer 120 with the lowest melting point tends to soften first.

This helps to allow the top layer 110 to yield and allow the intruder to remove the top layer 110 relatively easily without the intruder realizing that the middle layer is in the process of melting. After the top layer 110 is removed, the intruder must still remove the rest of laminate 120 and as well as layer 130 in order to access the document core or inlay 140. When the intruder keeps heating the ID document 100 in attempt to remove the rest of laminate 105, the remaining laminate becomes more and more fluid and tacky while the document core or inlay 140 remains intact. The fluidness and tackiness of the remaining laminate makes it extremely difficult to be removed. The top layer 110 is the only structure that the intruder can physically hold onto to peel off the multi-layer laminate 105. Since at this point the top layer 110 has already been removed by the intruder, there is nothing left in the laminate 105 allowing the intruder to perform any further peeling operations. In other words, the top layer 110 serves as a "sacrificial layer" to enhance the protection of the document core or inlay 140. As a result of the heating attack, the attacked ID document displays major evidence of tampering. Re-attaching the removed top layer to reverse the heating attack is extremely difficult, at least partially attributable to a distorted or a destroyed middle layer 120 and any distorted or destroyed engraving 122. The multi-layer laminates of the present invention, in one aspect, have been found to provide greatly enhanced durability.

EXAMPLE 1

In a first example, that of an IAB Horizontal Flex Test (as specified in ANSI INCITS 322-2002, 5.4), ID documents made in accordance with the present disclosure were flexed in one orientation with their front side up in their long axis. The frequency of the flex was set at 60 cycles per minute. At 25,000 flex intervals, the tested ID document was taken out for examination of its physical integrity and RF response by a B5000 reader. Experiments have shown that ID documents protected by multi-layer laminates made in accordance with the present disclosure can have an IAB flex life above 100,000 cycles and withstand flex repetitions on the order of 8 to 10+ times that of a typical "all polycarbonate" commercially available contactless smart card. The chart below illustrates the text results of the flex testing. In the below chart, sets #1 and #2 are cards made according to the present invention and "PC Card" is a polycarbonate card not made in accordance with the present invention.

| Horizontal IAB Flex (Electrical/physical) | | | | |
|---|---|---|---|---|
| Version | Card # | 50,000 | 75,000 | 100,000 |
| Set #1 | 1 | Pass | Pass | Pass |
| Set #1 | 2 | Pass | Pass | Pass |
| Set #1 | 3 | Pass | Pass | Pass |
| Set #1 | 4 | Pass | Pass | Pass |
| Set #1 | 5 | Pass | Pass | Pass |
| Set #1 | 6 | Pass | Pass | Pass |
| Set #2 | 1 | Pass | Pass | Pass |
| Set #2 | 2 | Pass | Pass | Pass |
| Set #2 | 3 | Pass | Pass | Pass |
| Set #2 | 4 | Pass | Pass | Pass |
| Set #2 | 5 | Pass | Pass | Pass |
| Set #2 | 6 | Pass | Pass | Pass |
| PC Card | | Failed | | |

EXAMPLE 2

In another example, that of a Severe Service test (as specified in ANSI INCITS 322-2002, 6.1), the $1^{st}$ phase of the test keeps an ID document in an environment of 70° C. temperature and 100% humidity for 5 days; the $2^{nd}$ phase of the test shakes the same ID document in a paint can containing small quantity of sand and water for 3 hours. Experiments have also shown that ID documents protected by such multi-layer laminates, as made in accordance with the present disclosure can withstand, at 100% of the time, the aforementioned Severe Service test as well as stress/cracking tests. The chart below illustrates the test results of the Severe Service Test.

| Severe Service Test | | | |
|---|---|---|---|
| First Part | | 2nd Part | |
| Delamination | RF response | Delamination (%) | RF response |
| Set #1 | None | Pass | <2% | Pass |
| Set #1 | None | Pass | <2% | Pass |
| Set #1 | None | Pass | <2% | Pass |
| Set #1 | None | Pass | <2% | Pass |
| Set #1 | None | Pass | <2% | Pass |
| Set #1 | None | Pass | <2% | Pass |
| Set #1 | None | Pass | <2% | Pass |
| Set #1 | None | Pass | <2% | Pass |
| Set #2 | None | Pass | <2.0% | Pass |
| Set #2 | None | Pass | <2.0% | Pass |
| Set #2 | None | Pass | <2.0% | Pass |
| Set #2 | None | Pass | <2.0% | Pass |
| Set #2 | None | Pass | <2.0% | Pass |
| Set #2 | None | Pass | <2.0% | Pass |
| Set #2 | None | Pass | <2.0% | Pass |
| Set #2 | None | Pass | <2.0% | Pass |

Set #1: 6 mil TriEx(2,1,3)/HID antenna/6 mil TriEx (2,1,3), Laminated without Gap;
Set #2: 6 mil TriEx(2,1,3)/HID antenna/6 mil TriEx (2,1,3), Laminated with a cooling plate The superior durability of ID documents made in accordance with the present disclosure protects both the personal information stored in the ID document and any electrical components (e.g., module or antenna) embedded in the ID document from physical and/or environmental factors/abuse/use. ID documents protected by the multi-layer laminates made according to the present invention may have a usage life of at least 10-15 years.

The multi-layer laminates of the present invention, in another aspect, provide intrusion resistance and tamper evidence, as illustrated by the failed heating attack described above. These multi-layer laminates, in yet another aspect, allow communication between the protected inlay's embedded module with an external reader/writer. The multi-layer laminate 105 according to the present invention can accommodate inlays with either wire/antennae/module architectures or printed antennae/flip chip architectures. The multi-layer laminates if the present invention can be configured to be compatible with commercially available inlays, such as those made by HID, ASK, KSW, and Smartrac. Thus, the inlay providers do not need to modify their inlays' existing structures or their manufacturing processes.

The ID documents with multi-layer laminate of the present invention also may support many commercially available chipsets. For example, ST Microelectronics (ST23YR80) and NXP SmartMX chipsets are supported. Memory configurations include, among others, 80K, 40K, SmarteID 8K cryptographic versions, and 1K/4K MIFARE. The supported operating systems include, among others, Masktech MTCOS STD 1.1 and NXP JCOP Java Card OS. Infineon chipsets (with Masktech OS or TCOP Java OS) with similar memory sizes may also be supported.

The ID documents with multi-layer laminate of the present invention can support many additional features, such as Micro-print, Bank Note preprint, Guilloche, IDMarc, Altered Font, Variable micro script, Overlapping data, Redundant data, 1D & 2D barcode, Ghost Portrait, and Tri-Color OVD w/ single color UV; Split fountain printing, Static UV, Security indicia, Kinegram, variable UV text and Ghost image, Full Color Variable UV and PolarPrime UV; and Offset Lithography pre-printing with color, UV and IR inks between 2400 and 4000 DPI.

An advantageous aspect of the structure of the ID document of FIG. 1, is that it can be manufactured as a fused architecture, without the use of or the need for adhesives 10 between the document core or inlay and the multi-layer laminate. U.S. Pat. No. 7,383,999, entitled "ID Document Structure with Pattern Coating Providing Variable Security Features", discloses exemplary manufacturing processes for ID documents. The foregoing patent is incorporated herein by reference in its entirety.

The detailed descriptions above in connection with the corresponding figures are intended to illustrate the present invention, and are not intended to represent the only forms in which the present invention may be constructed and/or utilized. While the descriptions set forth the structure and the sequence of steps for practicing the present invention in connection, it is to be understood, however, that the same or equivalent structures and steps may be accomplished by different embodiments that are also intended to be encompassed within the spirit and scope of the invention. Accordingly, it is not intended that the invention be limited except by the claims.

It is noted that one or more references are incorporated herein. To the extent that any of the incorporated material is inconsistent with the present disclosure, the present disclosure shall control. Furthermore, to the extent necessary, material incorporated by reference herein should be disregarded if necessary to preserve the validity of the claims.

Further, while the description above refers to the invention, the description may include more than one invention.

What is claimed is:
1. An ID document comprising:
   a document core layer having two opposed surfaces; and
   a multi-layer laminate on at least one surface of the document core layer, the multi-layer laminate comprising:
   a top layer;
   a middle layer; and
   a bottom layer,
   wherein a melting point of the bottom layer is higher than a melting point of the middle layer but is lower than a thermal softening/deformation point of the top layer.

2. The ID document of claim 1, wherein:
the top layer is about 1 mil to about 2 mils in thickness;
the middle layer is about 2 mils in thickness; and
the bottom layer is about 3 mils in thickness.

3. The ID document of claim 1, wherein:
the multi-layer laminate is disposed on both opposed surfaces of the document core layer.

4. The ID document of claim 1, further comprising:
an inlay having two opposed surfaces, the inlay further comprising at least one of an electronic processing circuitry and an electronic memory circuitry embedded therein.

5. The ID document of claim 4, wherein the inlay further comprises an outer layer on each of the opposed surfaces, the outer layer comprising a Teslin® material.

6. The ID document of claim 1, wherein:
the top layer comprises a material with at least one of strong intrusion resistance, high mechanical strength, high chemical resistance, high solvent resistance and high scratch resistance.

7. The ID document of claim 6, wherein the top layer material comprises a Biax Polyethylene Terephthalate (Biax PET) material.

8. The ID document of claim 1, wherein the middle layer comprises a material with a low melting point.

9. The ID document of claim 8, wherein the middle layer comprises a polymer hot melt material.

10. The ID document of claim 1, wherein the bottom layer comprises a material with a relatively high softening point and stronger mechanical strength than the middle layer.

11. The ID document of claim 1, wherein:
the melting point of the middle layer is in the range of about 200° C. to about 220° C.; and
the melting point of the bottom layer is in the range of about 260° C. to about 280° C.

12. The ID document of claim 11, wherein the thermal softening/deformation point is of the top layer is significantly higher than the melting point ranges of the middle layer and the bottom layer.

13. The apparatus of claim 11, wherein the thermal softening/deformation point of the top layer is greater than the melting point ranges of both the middle layer and the bottom layer.

14. The apparatus of claim 13, wherein the thermal softening/deformation point of the top layer is greater than about 300° C.

15. The ID document of claim 1, wherein:
the top layer comprises a material with a high resistance to solvents.

16. The ID document of claim 1, further comprising laser engraving within at least one of the middle layer and the bottom layer.

17. The ID document of claim 16, wherein the laser engraving is at least one of a photo or a text.

18. The ID document of claim 16, wherein the top layer is a 1 mil Polyethylene Terephthalate (PET) film layer.

19. The ID document of claim 16, wherein the laser engraving is of at least one of fixed information or variable information.

20. The ID document of claim 16, wherein at least one of the middle layer and the bottom layer contains a sensitizer additive to facilitate absorption of laser engraving.

21. The ID document of claim 16, wherein the at least one of the middle layer and the bottom layer is of a material which absorbs laser energy.

22. The ID document of claim 1, wherein:
the multi-layer laminate is in the range of about 4 mils to about 10 mils thickness.

23. The ID document of claim 22, wherein:
the multi-layer laminate is about 6 mils in thickness.

24. The ID document of claim 1, wherein:
the multi-layer laminate passes at least one of: an IAB Flex Test and a Severe Service Test; wherein the IAB Flex Test comprises at least 50,000 flexes; and
wherein the Severe Service Test is conducted at a temperature of about 70° C.

25. An ID document comprising:
a document core having two opposed surfaces; and
a multi-layer laminate on at least one surface of the document core, the multi-layer laminate comprising:
a top layer, the top layer being composed of a first material having at least one of: strong intrusion resistance, high scratch resistance, high mechanical strength, high chemical resistance, high thermal softening/deformation point and high resistance to solvents;
a middle layer, the middle layer being composed of a second material having a low melting point; and
a bottom layer, the bottom layer being composed of a third material having strong binding to the document core and a melting point higher than the middle layer.

26. A smart card document comprising:
an inlay having two opposed surfaces, the inlay further comprising at least one of an electronic processing circuitry and an electronic memory circuitry embedded therein; and
a multi-layer laminate on at least one surface of the inlay, the multi-layer laminate comprising:
a top layer;
a middle layer; and
a bottom layer, wherein a melting point of the bottom layer is higher than a melting point of the middle layer but is lower than a thermal softening/deformation point of the top layer.

27. A method of manufacturing a smart card document, the method comprising:
providing an inlay having two opposed surfaces, the inlay comprising at least one of an electronic processing circuitry and an electronic memory circuitry embedded therein;
providing a multi-layer laminate, the multi-layer laminate comprising a top layer, a middle layer, and a bottom layer, wherein a melting point of the bottom layer is higher than a melting point of the middle layer but is lower than a thermal softening/deformation point of the top layer; and
applying the multi-layer laminate on at least one surface of the inlay.

28. The method of claim 27, wherein the step of applying the multi-layer laminate to the at least one surface of the inlay comprises applying at least one of pressure and heat to bond the multi-layer laminate to the at least one surface of the inlay.

29. The method of claim 28, wherein the step of applying pressure comprising pressing the multi-layer laminate to the inlay with a pressure in the range of about 40 psi to about 60 psi.

30. The method of claim 29, wherein the step of applying pressure has a duration of time of about 0.5 seconds to about 2.0 seconds per inch.

31. The method of claim 28, wherein the step of applying heat comprises heating at least one of the multi-layer laminate and the inlay to heat in the range of about 325° F. to about 370° F.

32. The method of claim 28, wherein both heat and pressure are applied to bond the multi-layer laminate to the inlay.

33. A smart card manufactured in accordance with the method of claim 27, wherein the application of heat for the purpose of intrusion causes the middle layer to soften and melt while the top layer remains intact, and wherein attempts to physically intrude into the smart card cause the top layer to be separated from the middle layer.

34. The smart card of claim 33, wherein the melting point of the middle layer is in the range of about 200° C. to about 220° C.

35. The smart card of claim 34, wherein the melting point of the bottom layer is in the range of about 260° C. to about 280° C.

36. The smart card of claim 35, wherein the thermal softening/deformation point of the top layer is significantly higher than the melting point ranges of both the middle layer and the bottom layer.

\* \* \* \* \*

UNITED STATES PATENT AND TRADEMARK OFFICE
CERTIFICATE OF CORRECTION

PATENT NO. : 9,061,486 B2  
APPLICATION NO. : 13/309817  
DATED : June 23, 2015  
INVENTOR(S) : Daoshen Bi and Robert Jones Page 1 of 1

It is certified that error appears in the above-identified patent and that said Letters Patent is hereby corrected as shown below:

In the claims

Column 11, Claim 12, line 38, change "is of" to --of--.

Column 11, Claim 13, line 42, change "The apparatus of claim" to --The ID document of claim--.

Column 11, Claim 14, line 46, change "The apparatus of claim" to --The ID document of claim--.

Signed and Sealed this
First Day of December, 2015

Michelle K. Lee
*Director of the United States Patent and Trademark Office*